(12) United States Patent
Hwang

(10) Patent No.: US 7,071,967 B2
(45) Date of Patent: Jul. 4, 2006

(54) PERSONAL COMPUTER CAMERA ADAPTED TO OPERATE AS A DIGITAL STILL CAMERA AND AN AUDIO REPRODUCING APPARATUS

(75) Inventor: Jeong Hwan Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 841 days.

(21) Appl. No.: 09/757,607

(22) Filed: Jan. 11, 2001

(65) Prior Publication Data

US 2001/0009439 A1    Jul. 26, 2001

(30) Foreign Application Priority Data

Jan. 21, 2000    (KR)    ................................ 2000/2860

(51) Int. Cl.
*H04N 5/225*    (2006.01)

(52) U.S. Cl. ................................ 348/207.1; 348/14.01; 348/211.12; 348/552

(58) Field of Classification Search ............. 348/211.1, 348/211.12, 231.4, 213.5, 455, 207.1, 207.11, 348/211, 14.02, 14.01, 14.08, 552, 231.99
See application file for complete search history.

(56) References Cited

U.S. PATENT DOCUMENTS

| | | | | |
|---|---|---|---|---|
| 4,888,795 A | * | 12/1989 | Ando et al. ............... | 348/14.14 |
| 6,005,613 A | * | 12/1999 | Endsley et al. .......... | 348/231.6 |
| 6,069,898 A | * | 5/2000 | Nakatsugawa ............... | 370/474 |
| 6,343,314 B1 | * | 1/2002 | Ludwig et al. ............. | 709/204 |
| 6,344,875 B1 | * | 2/2002 | Hashimoto et al. ...... | 348/207.1 |
| 6,380,975 B1 | * | 4/2002 | Suzuki ................... | 348/231.99 |
| 6,535,243 B1 | * | 3/2003 | Tullis ....................... | 348/207.1 |
| 6,657,654 B1 | * | 12/2003 | Narayanaswami ....... | 348/14.04 |
| 6,738,075 B1 | * | 5/2004 | Torres et al. ................ | 715/723 |
| 2002/0089592 A1 | * | 7/2002 | Hashimoto et al. ......... | 348/211 |

OTHER PUBLICATIONS

Yamada, Y. Ohta, K. Mizuno, T. Extracting and Viewing Infomration Method for Mob Tele-Conference System. Jul. 15-17, 1998. Computer Human Intercation, 1998. Proceedings Pacific. pp. 430-435.*

* cited by examiner

*Primary Examiner*—Tuan Ho
*Assistant Examiner*—Gevell Selby
(74) *Attorney, Agent, or Firm*—Birch, Stewart, Kolasch & Birch, LLP

(57) ABSTRACT

The present invention provides a PC camera with various applications, which is capable of being used as a digital camera independently after separating from the PC. The PC camera includes a memory for storing digital audio data, and a digital audio decoder for reproducing an original sound by decoding the digital audio data stored in the memory in a digital audio reproducing mode of the PC camera.

17 Claims, 8 Drawing Sheets

US 7,071,967 B2

PERSONAL COMPUTER CAMERA ADAPTED TO OPERATE AS A DIGITAL STILL CAMERA AND AN AUDIO REPRODUCING APPARATUS

BACKGROUND OF THE INVENTION

1. Field of the Invention

The present invention relates to a PC (Personal Computer) camera, in particular to a PC camera with various applications, which is capable of operating as a digital camera and a digital audio reproducing apparatus independently by separating from a PC.

2. Description of the Prior Art

In the present times, a PC (Personal Computer) camera is used for a video conference. The PC camera adopts a USB (Universal Serial Bus) standard in order to interface with a PC directly.

However, in the conventional technology, the PC camera can operate only when it is connected to the PC, and it only has a function for transmitting a photographed image to the PC.

Accordingly, the conventional PC camera can not be used as a camera after it is separated from the PC.

SUMMARY OF THE INVENTION

Therefore, it is an object of the present invention to provide a PC camera with various applications which can be used a digital camera and a digital audio reproducing apparatus independently by separating from a PC.

In addition, the present invention is capable of listening digital audio data by storing the digital audio data.

And, the present invention is capable of adjusting focus and brightness of the PC camera when it is independently used as the digital camera.

In addition, the present invention is capable of transmitting the image photographed by the PC camera or the compressed photographed image by a wireless communication method.

Therefore, an object of the present invention is to provide a PC camera for transmitting a photographed image to a PC by converting the photographed image into a USB standard signal.

The PC camera according to an aspect of the present invention comprises a view finder for recognizing direction and range of a photographing object, a memory for storing a photographed image and digital audio data, an image processing unit for transmitting a picture-processed photographing image signal to the PC in a video conference mode, storing the picture-processed photographing image signal on the memory after compressing it in a digital camera mode, transmitting the compressed image signal stored on the memory to the PC in a still image transmission mode, a digital audio decoder for restoring the digital audio data stored on the memory into an original signal in a digital audio reproducing mode, a control unit for judging the video conference mode, digital camera mode, still image transmission mode or digital audio reproducing mode in accordance with open/close of a lens cap and combination/separation with/from the PC and controlling the pertinent operation, and a backup battery unit for charging voltage provided from the outside in the video conference mode or still image transmission mode, and providing the charged voltage as an operating voltage in the digital camera mode or digital audio reproducing mode.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE PREFERRED EMBODIMENTS

Hereinafter, the present invention will now be described with reference to accompanying drawings in detail.

Figure 1:
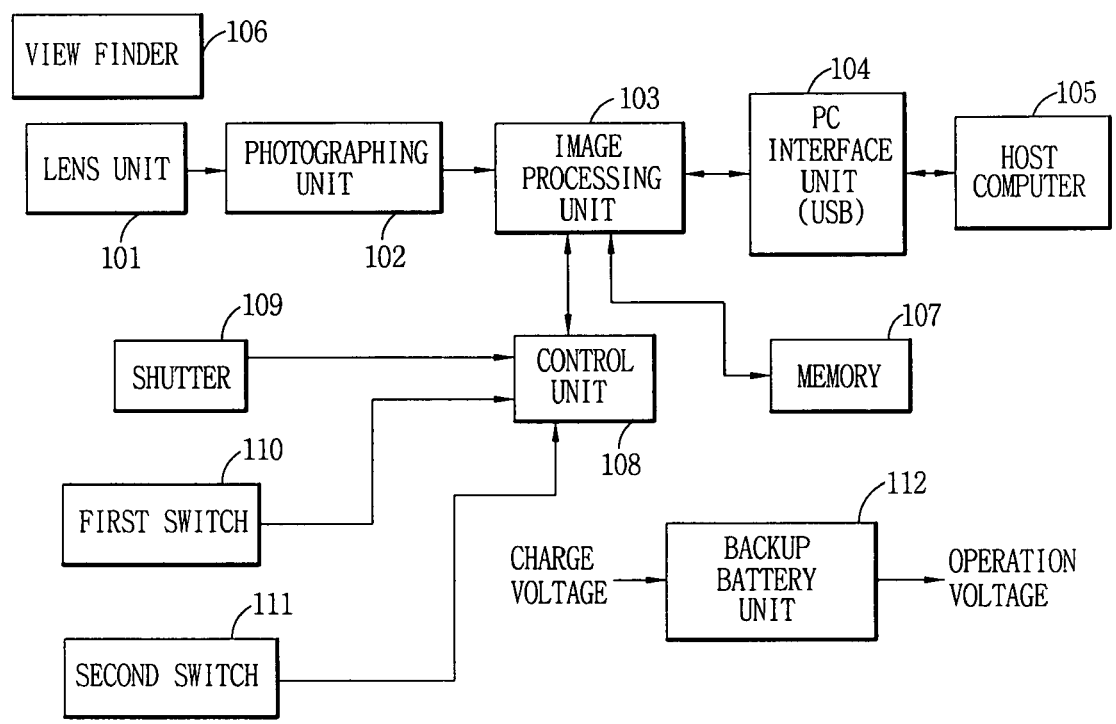
FIG. 1 is a block diagram illustrating a PC camera with various applications according to a first embodiment of the present invention.

FIG. 1 is a block diagram illustrating a PC camera with various applications according to the first embodiment of the present invention. As depicted in FIG. 1, the PC camera with various applications according to the embodiment of the present invention comprises a view finder 106 for recognizing direction and range of an photographing object, a lens unit 101 for concentrating light from a subject, a photographing unit 102 for converting the light about the concentrated image by the lens unit 101 into an electric signal, an image processing unit 103 for converting the electric signal of the photographing unit 102 into a digital signal and image-processing it in order to output the image-processed digital signal as it is in a video conference mode, and to compress and store the image-processed digital signal at the press time point when a shutter 109 is pressed in the digital camera mode, a memory 107 for storing the digital image data compressed by the image processing unit 103 in the digital camera mode, a PC interface unit 104 for transmitting the image-processed digital signal to a host computer 105 in the video conference mode, transmitting the compressed image data stored on the memory 107 to the host computer 105 in the still image transmission mode, a first switch 110 for opening/closing a lens cap, a second switch 111 for detecting a combination/separation with/from the host computer 105, a control unit 108 for controlling the operation(s) of the image processing unit 103 in order to perform the digital signal processing about the concentrated image in the video conference mode or digital camera mode, judging it as the video conference mode when the first and second switches are ON state, judging it as the still image transmission mode for transmitting the concentrated still image to the host computer 105 when the first switch 110 is OFF and the second switch 111 is ON, and judging it as the digital camera mode for photographing the still image when the first switch 110 is ON and the second switch 111 is OFF, and a backup battery unit 112 for charging voltage provided through the PC interface unit 104 in the video conference mode or still image transmission mode and providing the charged voltage as operation voltage in the digital camera mode.

The PC interface unit 104 is constructed so as to input/output USB (Universal Serial Bus) standard data.

Figure 2A:
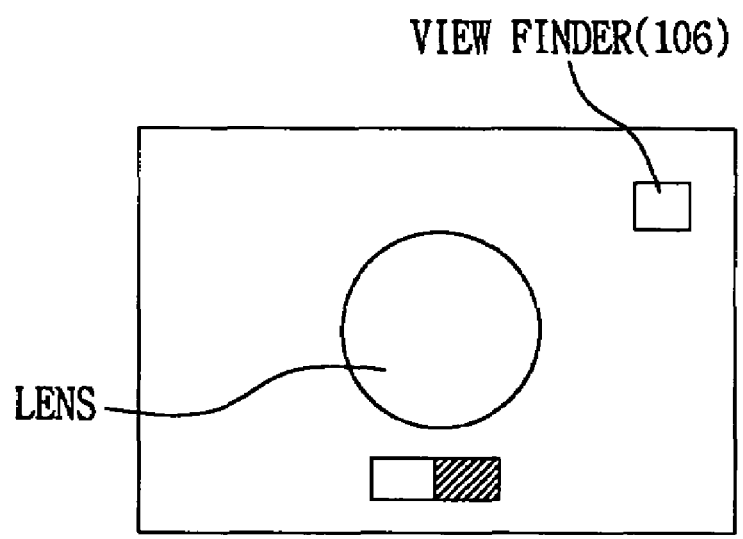
FIGS. 2A and 2B illustrate an open/close state of a lens cap.
Figure 2B:
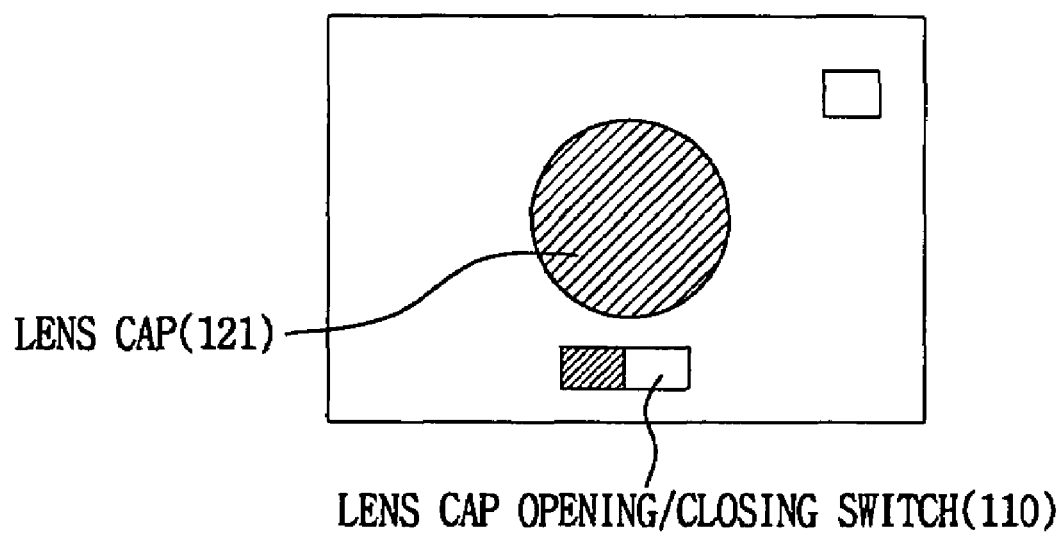

The first switch 110 is constructed so as to be ON when the lens cap is open as depicted in FIG. 2A and so as to be OFF when the lens cap is closed as depicted in FIG. 2B.

Figure 3A:
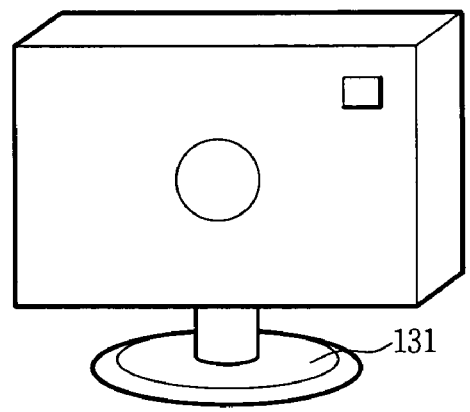
FIGS. 3A through 3C illustrate a combination/separation state of the PC camera.
Figure 3B:
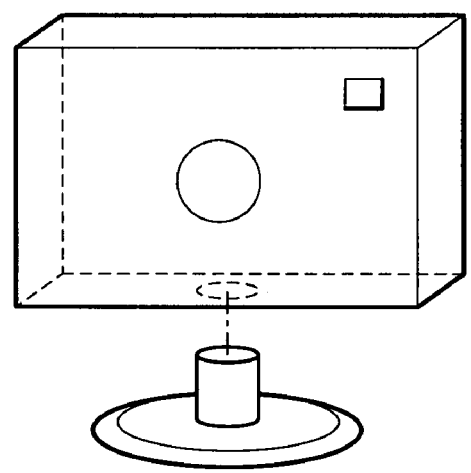
Figure 3C:
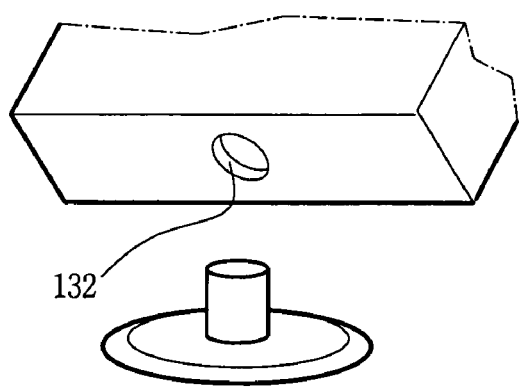

The second switch 111 is installed inside of a groove 132 formed on the lower end portion of the PC camera as depicted in FIGS. 3B and 3C so as to be ON when it is combined to a holder 131 in order to fix the PC camera on the holder 131 as depicted in FIG. 3A.

The operation and effect of the PC camera with various applications according to the first embodiment of the present invention will now be described.

In the first embodiment of the present invention, the lens unit 101 concentrates the light from the subject, the photographing unit 102 converts it into the electric signal, and the image processing unit 103 converts the electric signal into the digital signal. Accordingly image processing about the subject is performed as a frame unit.

First, in the video conference mode, when the PC camera is combined to the holder 131, the second switch 111 is turned ON, and the first switch 110 is turned ON by opening the lens cap in order to photograph the subject.

Herein, the control unit 108 judges it as the video conference mode, and controls the image processing unit 103 so as to transmit the image-processed signal to the host computer 105 as the frame unit through the PC interface unit 104.

Accordingly, the host computer 105 processes the image transmitted from the PC camera, displays the image on a screen of a display unit (not shown) such as a monitor, and transmits the image to remote place by using a communication unit (not shown) such as a modem in case of need.

And, the focus and brightness of the captured image can be adjusted by using a program installed on the host computer 105.

For example, in the focus adjustment, when the subject image displayed on the screen of the display unit (not shown) is too far, the focus about the subject can be adjusted by decreasing the range of the image for converting into the electric signal on the photographing unit 102. In addition, in the brightness adjustment, when the subject image is too dark, the brightness of the subject image can be adjusted by adjusting the brightness on the image processing unit 103.

In addition, when the PC camera is separated from the holder 131 and thus the second switch 111 is turned OFF, the control unit 108 judges it as a standby state for the digital camera mode.

Herein, when the user opens the lens cap, the first switch 110 is turned ON, the control unit 108 judges it as the digital camera mode, and the image data image-processed orderly through the lens unit 101, photographing unit 102, image processing unit 103 is temporarily stored on the memory 107.

According to this, when a user presses the shutter 109 while watching the subject through the view finder 106 after determining the range of the photographing subject, the control unit 108 informs it to the image processing unit 103, the image processing unit 103 reads image information in the press time point of the shutter 109 from the memory 107 and compresses it, and stores it on the memory 107.

The operation for storing the compressed image information is performed repeatedly whenever the user presses the shutter 109.

After that, when the user combines the PC camera to the holder in a state which the lens cap is closed in order to edit or print the photographed still image, the first switch 110 becomes OFF, and the second switch 111 becomes ON. Accordingly the still image transmission mode is set.

Herein, the user operates the program installed on the host computer 105 for image-processing, and transmits the control signal for the still image transmission to the PC camera.

According to this, the control unit 108 controls the image processing unit 103 so as to transmit the still image, the image processing unit 103 reads the compressed image information stored on the memory 107, and transmits it to the host computer 105 through the PC interface unit 104.

The operation for judging the combination/separation between the PC camera and host computer 105 by the ON/OFF state of the second switch 111 is described above. However, it is also possible to judge the combination/separation between the PC camera and host computer 105 by detecting a reception signal (for example, USB standard signal) through the PC interface unit 104.

Herein, the present invention can be constructed so as to judge the digital camera mode switch by using the method for detecting the reception signal (for example, USB standard signal) from the PC and the other method for judging the ON/OFF state of the second switch 111 at the same time.

In other words, when the PC camera is separated from the host computer 105, the PC camera is automatically switched into the digital camera mode.

In the present invention, the video conference mode or digital camera mode or digital audio reproducing mode is selected in accordance with the ON/OFF of the first switch 110 operated by the open/close state of the lens cap and the ON/OFF of the second switch 111 operated by the combination/separation state of the camera from the holder 131. In addition, a plurality of operating buttons for a mode switch and a certain function selection, etc. can be additionally constructed in the present invention.

For example, a mode select switch for selecting one mode among the video conference mode, the digital camera mode, and the digital audio reproducing mode is provided, and function buttons for a music selection, audio volume adjustment, reproducing start, etc. in the digital audio reproducing mode are provided.

And, the video conference mode does not require the operation power, but the operation power is required for operating as the digital camera mode.

Accordingly, in the first embodiment of the present invention, the backup battery unit 112 performs the charge operation in the PC-camera combination state with the host computer 105, and provides the charge voltage as the operation voltage in the separation state from the host computer 105.

Herein, the backup voltage is provided to the host computer 105 through the PC interface unit 104.

Figure 4:
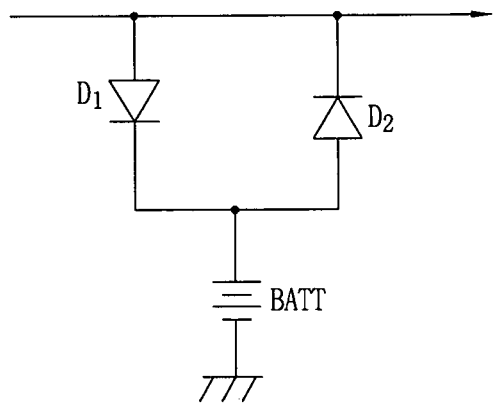
FIG. 4 is a circuit diagram illustrating a backup battery unit of FIG. 1.

As depicted in FIG. 4, the backup battery unit 112 comprises two switching diodes D1, D2 and a battery. In the video conference mode or still image transmission mode, the switching diode D2 is OFF and the switching diode D1 is ON, the backup power is provided to a battery, and accordingly it is charged. In the digital camera mode, the switching diode D1 is OFF and the switching diode D2 is ON. The charge voltage of the battery is provided as the operation voltage through the switching diode D2.

An additional power port for providing backup voltage from the outside can be provided or an additional battery can be installed in the present invention.

Figure 5:
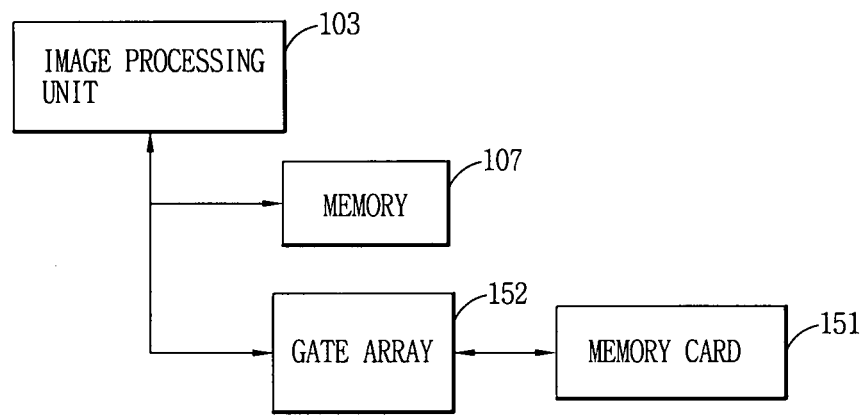
FIG. 5 is a block diagram illustrating a partial construction of the PC camera with various applications according to a second embodiment of the present invention.

In the present invention, the memory 107 for storing the photographed image information is described in the first embodiment, as depicted in FIG. 5. In addition, an additional memory card 151 can be provided in the second embodiment of the present invention.

In other words, in the second embodiment of the present invention, the additional memory card 151 for storing the compressed image information temporarily stored on the memory 107 and a gate array 152 for inputting/outputting the image information between the image processing unit 103 or the memory 107 and the memory card 151 are provided.

The operation of the second embodiment of the present invention will now be described.

Although the memory card 151 is installed in the second embodiment, the operation about the video conference mode, the still image transmission mode, and the digital camera mode is the same as the first embodiment of the present invention.

Accordingly, when the digital camera mode is set and the user records the subject, the image information compressed on the image processing unit 103 is stored on the memory 107.

After that, the compressed image information stored on the memory 107 is stored on the memory card 151 through the gate array 152.

Herein, the storing of the compressed image information on the memory card 151 can be performed automatically when a certain key is selected or the memory card 151 is installed.

And, in the third embodiment of the present invention, when the PC camera is used as the digital camera, the focus can be adjusted with a manual operation.

Figure 6:
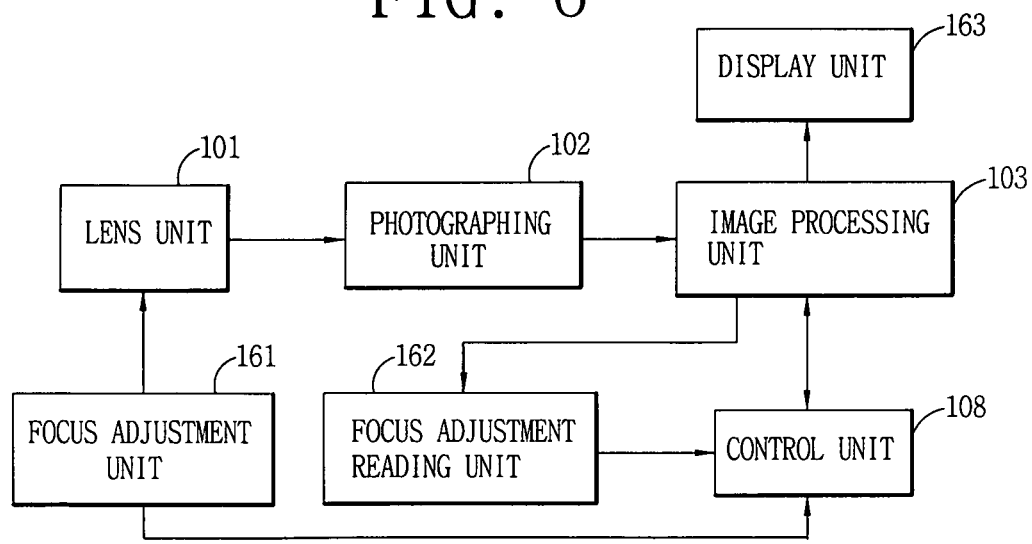
FIG. 6 is a block diagram illustrating a PC camera with various applications according to a third embodiment of the present invention.

In other words, as depicted in FIG. 6, the third embodiment of the present invention having generally the same construction as the first embodiment comprises a focus adjustment unit 161 for adjusting a focus of the lens unit 101, a focus adjustment reading unit 162 for extracting the edge element of the subject from the image frame of the image processing unit 103, reading the focus adjustment, and transmitting the reading result to the control unit 108, and a display unit 163 for displaying the focus adjustment result transmitted from the image processing unit 103 by the control of the control unit 108.

Figure 7:
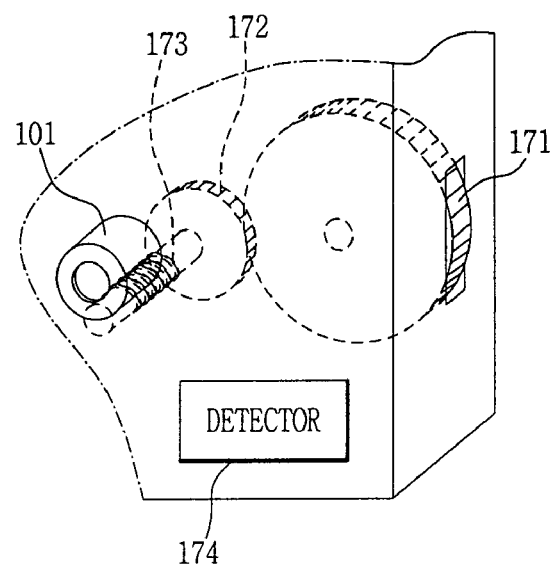
FIG. 7 is a construction profile illustrating a focus adjustment switch unit of FIG. 6.

As depicted in FIG. 7, the focus adjustment unit 161 comprises a switch 171 having a saw tooth shape for moving the position of the lens unit 101, a switch 172 having a saw tooth shape rotated by the rotation of the switch 171, a screw 173 installed on the center of the switch 172 for moving the lens unit 101 back and forth in accordance with the rotation of the switch 172, and a detector 174 for detecting the rotation of the switches 171, 172 or screw 173 and transmitting the detection result to the control unit 108.

Herein, the detector 174 can be constructed as a rotary encoder.

When the control unit 108 detects the focus adjustment of the focus adjustment unit 161, it transmits the image frame after the focus adjustment to the focus adjustment reading unit 162, and at the same time it controls the image processing unit 103 in order to display the reading result of the focus adjustment reading unit 162 on the display unit 163.

Figure 8:
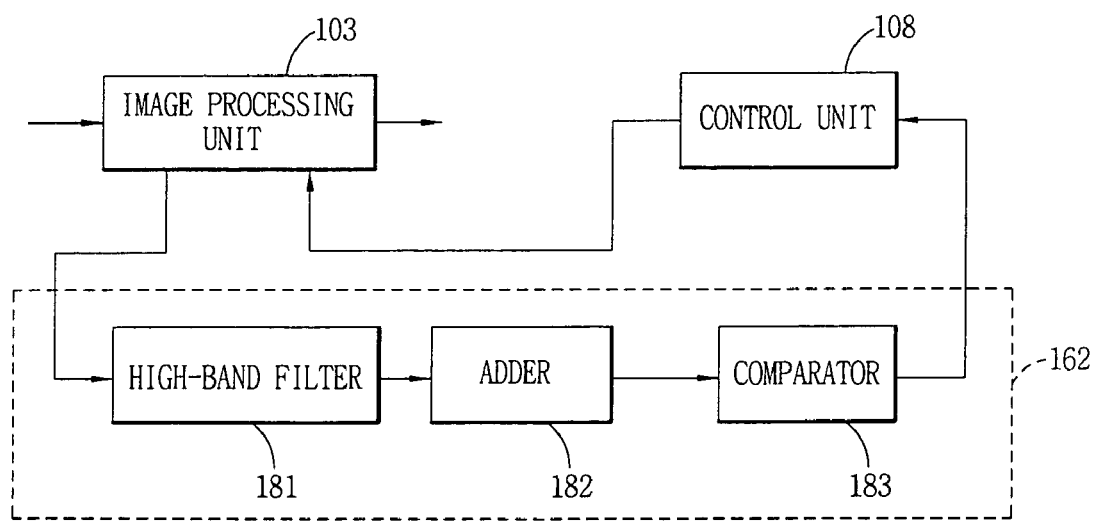
FIG. 8 is a block diagram illustrating a focus adjustment reading unit of FIG. 6.

As depicted in FIG. 8, the focus adjustment reading unit 162 comprises a high-band filter 181 for extracting the edge element of the subject by performing the high-band filtering of the image frame from the image processing unit 103, an adder 182 for adding the edge element values from the high-band filter 181, and a comparator 183 for comparing the added result value of the adder 182 with a certain value and transmitting the compared result (for example, a high signal is transmitted when the added value is bigger than the certain set value) is transmitted to the control unit 108.

The display unit 163 is constructed as a 7-segment LED or LCD.

The operation and effect of the third embodiment according to the present invention will now be described.

When the user rotates the switch 171, the lens unit 101 moves back or forth by the rotation of the switch 172 having the screw 173, the detector 174 detects the rotation of the switches 171, 172 or screw 173 and transmits it to the control unit 108.

Herein, when the image concentrated on the lens unit 101 is converted into the electric signal by the photographing unit 102, the image processing unit 103 performs the image processing by converting it into the digital signal.

According to this, the high-band filter 181 of the focus adjustment reading unit 162 performs the high-band filtering of the image frame from the image processing unit 103, and extracts the edge element of the subject. The adder 182 adds all edge element values, the comparator 183 compares the added value with a certain set value, and the compared result is transmitted to the control unit 108.

Herein, when a low signal is inputted from the focus adjustment reading unit 162, the control unit 108 judges it to mean that the focus is not adjusted, and controls the image processing unit 103 in order to display it.

According to this, the image processing unit 103 transmits the information for displaying a focus non-adjustment state to the display unit 163.

On the contrary, when the high signal is inputted from the focus adjustment reading unit 162, the control unit 108 judges it to mean that the focus is adjusted, and the control unit 108 controls the image processing unit 103 in order to display it.

According to this, the image processing unit 103 transmits the information for displaying the focus adjustment state to the display unit 163.

Figure 9:
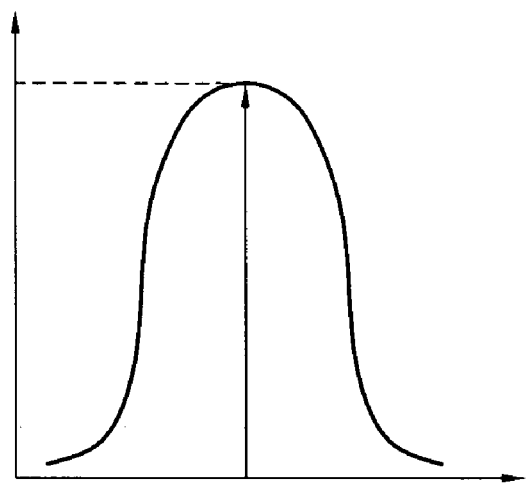
FIG. 9 is a wave gram illustrating an edge element value in focus adjustment reading of FIG. 6.

For example, the output value of the adder 182 can be displayed as the waveform diagram of FIG. 9 in accordance with the focus adjustment. When the focus is adjusted, the output value of the adder 182 can be the highest.

Herein, the display unit 163 displays the focus adjustment result with a number or character.

Accordingly, the user adjusts the focus while watching the number or character displayed on the display unit 163.

Until now the technology for adjusting the focus with a manual operation is described. Meanwhile, in the fourth embodiment of the present invention, the brightness can be adjusted with a manual operation.

Figure 10:
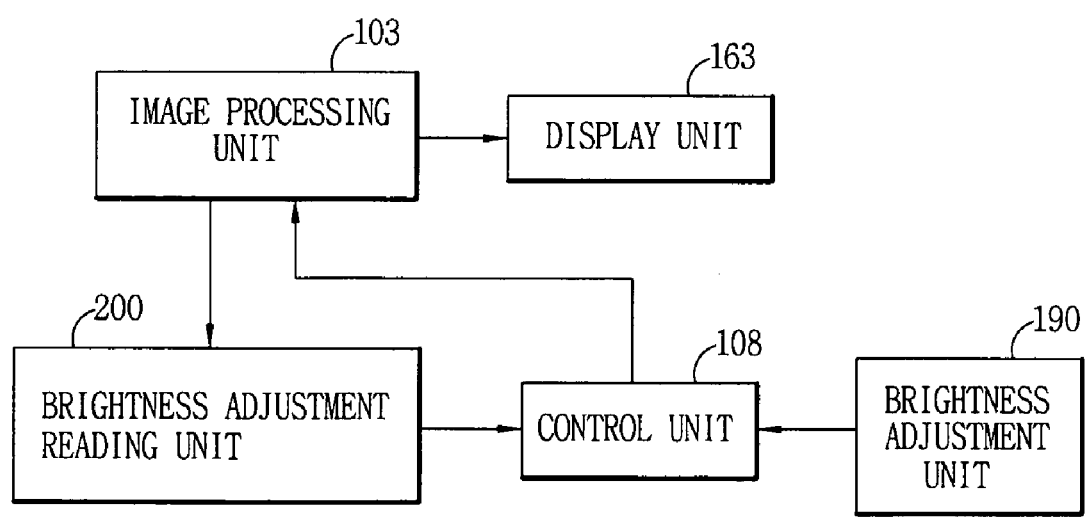
FIG. 10 is a block diagram illustrating a PC camera with various applications according to a fourth embodiment of the present invention.

In other words, as depicted in FIG. 10, the fourth embodiment of the present invention having generally the same construction as the first embodiment comprises a brightness adjustment unit 190 for adjusting the brightness of the image in photographing, and a brightness adjustment reading unit 200 for finding the difference of the consecutive image frames inputted from the image processing unit 103 before and after the brightness adjustment. The brightness adjustment unit 190 transmits the resultant value to the control unit 108.

The brightness adjustment unit 190 can be constructed as a slide switch.

When the brightness adjustment unit 190 operates, the control unit 108 judges it as a brightness adjustment mode, transmits the image frame before and after the brightness adjustment to the brightness adjustment reading unit 200, and at the same time controls the image processing unit 103 in order to display the resultant value from the brightness adjustment reading unit 200 on the display unit 163.

Figure 11:
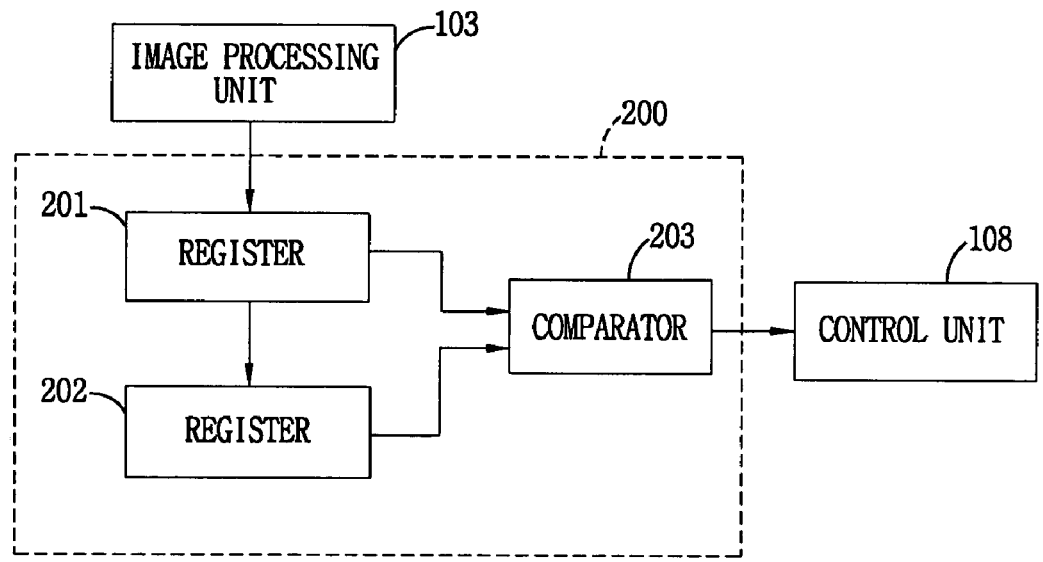
FIG. 11 is a block diagram illustrating a brightness adjustment reading unit of FIG. 10.

As depicted in FIG. 11, the brightness adjustment reading unit 200 comprises registers 201, 202 for storing consecutive two frames, and a comparator 203 for comparing the image frames stored on the registers 201, 202 and transmitting the difference to the control unit 108.

The operation of the fourth embodiment according to the present invention will now be described.

When the user adjusts the position of the slide switch in the brightness adjustment unit 190, the control unit 108 judges the mode to be the brightness adjustment mode, and controls the image processing unit 103 in order to transmit the image frames before and after the brightness adjustment, to the brightness adjustment reading unit 200.

Herein, when the image frame before the brightness adjustment is transmitted, it is stored on the register 201. Again when the image frame after the brightness adjustment is transmitted, the image frame stored on the register 201 is stored on the register 202, and the newly transmitted image frame is stored on the register 201.

According to this, the comparator 203 compares the image frames stored on the registers 201, 202, and transmits the differences to the control unit 108.

Herein, the control unit 108 controls the image processing unit 103 in order to display the differences transmitted from the brightness adjustment reading unit 200 on the display unit 163.

Accordingly, the user adjusts the image brightness in photographing by adjusting the slide switch in the brightness adjustment unit 190 while watching the number displayed on the display unit 163.

Herein, comparing between the two image frames is performed about a certain same region corresponding to each other.

Until now the method for comparing the consecutive two image frames is described. The brightness of the image can be adjusted by storing a certain set brightness value in advance and comparing the brightness value of the image frame with the certain set value in photographing.

In addition, in the third and fourth embodiments of the present invention, the focus adjustment reading unit 162 and brightness adjustment reading unit 200 are provided additionally, but it is also possible to construct the focus adjustment reading unit 162 and brightness adjustment reading unit 200 inside of the image processing unit 103. In this case, the control unit 108 receiving the reading result judges the focus and brightness adjustment, and controls the image processing unit 103 in order to display it on the display unit 163.

In this case, the focus and brightness can be adjusted automatically by the control of the control unit 108.

And, in the fifth embodiment of the present invention, digital audio data can be reproduced.

Herein, the digital audio data will now be described with an example of MP3 data.

Figure 12:
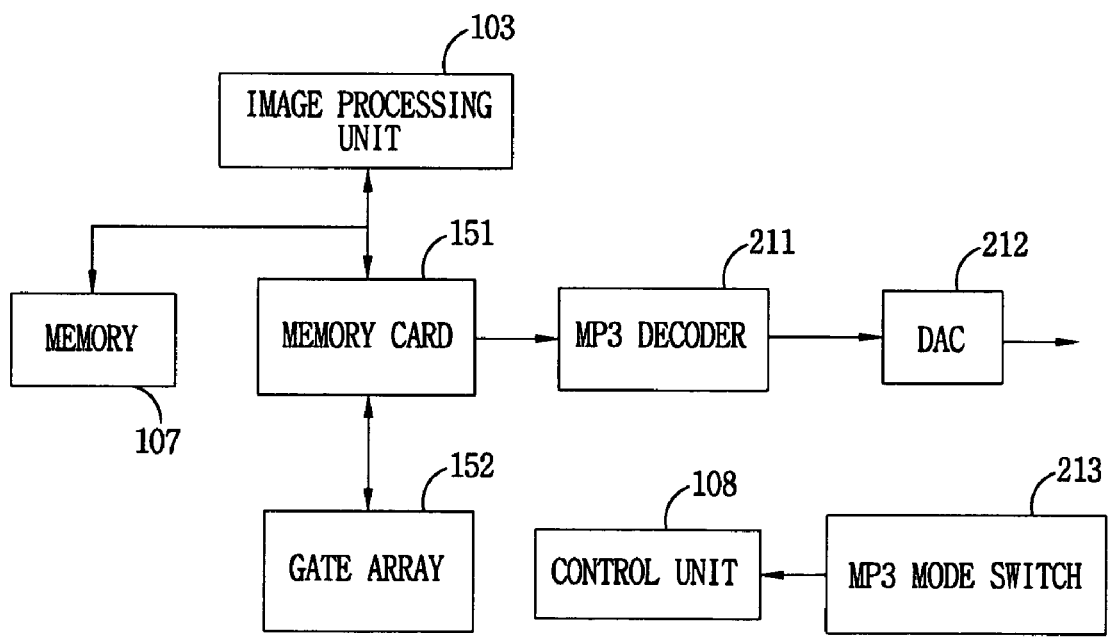
FIG. 12 is a block diagram illustrating a PC camera with various applications according to a fifth embodiment of the present invention.

In other words, as depicted in FIG. 12, the fifth embodiment of the present invention having generally the same construction as the first embodiment comprises an image processing unit 103 for storing temporarily the MP3 data transmitted from the host computer 105 on the memory 107, a switch 213 for switching ON/OFF the MP3 mode, a MP3 decoder 211 for restoring the MP3 data transmitted through the gate array 152 into the original signal when the lens cap is closed and the switch 213 is turned ON, and a digital/analog converter 212 for converting the digital signal from the MP3 decoder 211 into the analog signal and outputting it to an earphone.

The operation of the fifth embodiment of the present invention will now be described.

First, when the PC camera is combined to the host computer 105, the user transmits the MP3 data downloaded from the Internet to the PC camera.

After that, when the user closes the lens caps after using the digital camera, the PC camera is in the switch standby state for the MP3 mode or still image transmission mode, when the MP3 mode switch 213 is OFF. As depicted in FIG. 1, the operation voltage from the backup battery unit 112 is cut off.

After that, when the MP3 mode switch 213 is turned ON, the gate array 152 reads the MP3 data stored on the memory 107 and transmits it to the MP3 decoder 211.

Herein, the MP3 decoder 211 decodes the MP3 data and outputs the original digital signal.

According to this, the digital/analog converter 212 converts the digital signal into the analog signal, outputs it to the earphone, and accordingly the user can listen to the MP3 music.

Herein, when the MP3 mode switch 213 is turned ON, the decoding operation is performed, and it is also possible to listen to the requested music with a selected volume by pressing buttons for selecting music, starting the reproducing, adjusting the volume, etc.

In the present invention, the MP3 data is stored on the memory 107. But, it is also possible to provide an additional memory card 151 for expanding the storage capacity.

In addition, when the switch 213 is turned ON in the lens cap closed state, the present invention is switched into the MP3 mode, and it is also possible to switch into the MP3 mode automatically when the earphone is connected.

Figure 13A:
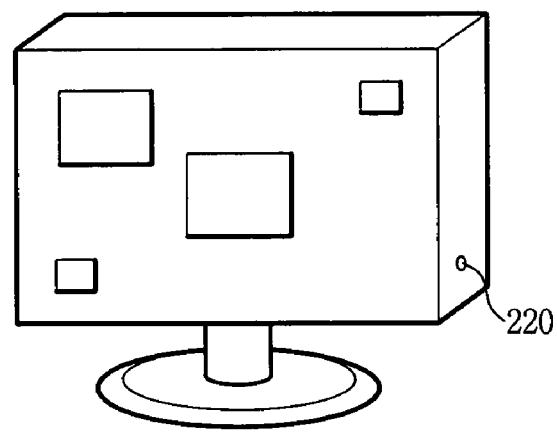
FIGS. 13A through 13C illustrate an earphone combination state of FIG. 12.
Figure 13B:
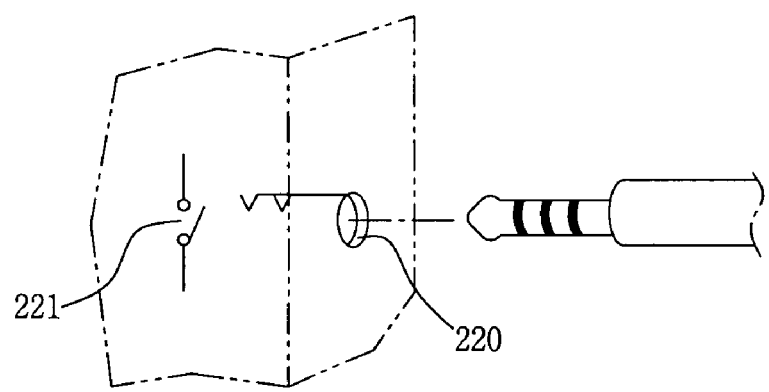
Figure 13C:
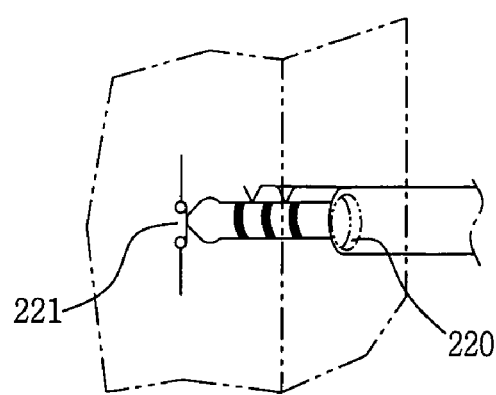

For example, as depicted in FIGS. 13A through 13C, when the earphone is inserted into a jack 220 installed on the side surface of the PC camera, the switch 221 installed inside the jack 220 is turned ON, and in response, the control unit 108 switches into the MP3 mode automatically.

Until now the method for operating the digital camera mode and MP3 mode by turns is described. But, it is also possible to listen to the MP3 music while photographing.

In this case, when the MP mode switch is turned ON and the earphone is connected, the digital camera mode and MP3 mode can be performed at the same time.

In addition, the present invention can comprise an additional wireless communication unit for transmitting the image photographed with the above-mentioned method and the compressed image stored on the memory unit to the host computer.

In other words, the present invention can be constructed to transmit the image photographed in the video conference mode or digital camera mode to the host computer 105 by using the wireless communication unit and converting the photographed image into the wireless signal.

In this case, it is possible to reproduce the MP3 data by receiving it by the wireless communication.

And, in the above-mentioned embodiment, the display unit 163 is constructed so as to display simple character or number in order to reduce the manufacturing cost. But it is also possible to provide an additional LCD for viewing the photographed image.

In this case, the focus and brightness can be adjusted by using the additional LCD.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A PC (personal computer) camera adapted to operate as a digital camera and a digital audio reproducing apparatus both independently of, and in connection with a PC, comprising:
   a first on/off switch for opening and closing a lens cap;
   a second switch for detecting whether the camera is, or is not, connected to the PC;
   a video conferencing mode of camera operation;
   a digital mode of camera operation for photographing a still image;
   a still image transmission mode of camera operation;
   a memory means for storing digital audio and video data; and
   a controller that determines that the camera (1) is in a still image transmission mode when the first switch is off and the second switch is on; (2) is in the digital mode of camera operation for photographing a still image when the first switch is on and the second switch is off; and (3) is in the videoconferencing mode when the first and second switches are on.

2. The PC camera according to claim 1, wherein the PC camera further comprises a digital audio decoding apparatus for decoding digital audio data in a digital reproduction mode of the camera and storing means for storing the digital audio data from the PC.

3. The PC camera according to claim 1, wherein the PC camera automatically switches into the digital audio reproducing mode when an earphone is inserted into the PC camera.

4. The PC camera according to claim 1, further comprising:
   first detecting means for detecting whether the PC camera is electrically separated from a PC; and
   mode switching means for automatically switching the PC camera to one of different modes of the PC camera based on the detection result.

5. The PC camera according to claim 4, wherein the first detecting means includes one of the following:
   a switch disposed at an area where the PC camera mates with a holder for the PC camera; or
   a detector detecting a receipt of a USB standard signal from the PC.

6. The PC camera according to claim 4, further comprising:
   second detecting means for detecting a use state of a lens of the PC camera.

7. The PC camera according to claim 6, wherein the mode switching means places the PC camera in a still image transmission mode if the first detecting means detects that the PC camera is electrically connected to the PC and if the second detecting means detects that the lens of the PC camera is not in a use state.

8. The PC camera according to claim 1, wherein the digital audio data are MP3 audio data downloaded by a PC coupled to the PC camera through a network.

9. The PC camera of claim 1, further comprising:
   a detector to detect if the PC camera is electrically connected to a PC,
   wherein the PC camera operates as a handheld digital camera used independently from the PC if the detector detects that the PC camera is electrically separated from the PC.

10. The PC camera according to claim 1, wherein the second switch is disposed at an area where the PC camera mates with a holder for the PC camera.

11. The PC camera according to claim 1, wherein the camera is adapted to detect receipt of a USB signal from the PC.

12. The PC camera according to claim 1, further comprising:
    a player to play back MP3 audio data downloaded from the PC.

13. The PC camera of claim 1, further comprising:
    a viewfinder for recognizing a direction and range of a photographing object;
    a memory means for storing a photographed compressed image and digital audio data;
    an image processing means for transmitting a picture-processed photographing image signal to a PC coupled to the PC camera in a video conference mode, storing the picture-processed photographing image signal on the memory means after compressing the image signal in a digital camera mode, transmitting the compressed image signal stored on the memory means to the PC in a still image transmission mode;
    a digital audio decoding means for reproducing an original sound by decoding the digital audio data stored on the memory means when a digital audio reproducing mode is set in the PC camera; and
    a control mean for controlling the operation corresponding to the pertinent mode after judging if the PC camera is in the video conference mode, the digital camera mode, the still image transmission mode or the digital audio reproducing mode.

14. The PC camera of claim 1, wherein the first switch is on when the lens cap is open and is off when the lens cap is closed.

15. The PC camera of claim 1, wherein the second switch is on when the camera is connected to the PC and the second switch is off when the camera is not connected to the PC.

16. The PC camera of claim 1, further comprising a standby mode of camera operation.

17. The PC camera of claim 1, further comprising a digital audio reproduction mode of camera operation.

* * * * *